US012603699B2

(12) United States Patent
Dreiling

(10) Patent No.: US 12,603,699 B2
(45) Date of Patent: Apr. 14, 2026

(54) ANTICIPATED LOSS OF SATELLITE COVERAGE

(71) Applicant: T-MOBILE INNOVATIONS LLC, Overland Park, KS (US)

(72) Inventor: Ryan P. Dreiling, Shawnee, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 377 days.

(21) Appl. No.: 18/456,358

(22) Filed: Aug. 25, 2023

(65) Prior Publication Data

US 2025/0070865 A1     Feb. 27, 2025

(51) Int. Cl.
*H04B 7/185*      (2006.01)
*H04W 76/10*      (2018.01)
*H04W 76/38*      (2018.01)

(52) U.S. Cl.
CPC ..... *H04B 7/18539* (2013.01); *H04B 7/18554* (2013.01); *H04W 76/10* (2018.02); *H04W 76/38* (2018.02)

(58) Field of Classification Search
CPC ........... H04B 7/18539; H04B 7/18554; H04W 76/10; H04W 76/38; H04W 76/30; H04W 84/06
See application file for complete search history.

(56) References Cited

U.S. PATENT DOCUMENTS

| | | | | |
|---|---|---|---|---|
| 2013/0047193 A1* | 2/2013 | Finkelstein | ........... | H04L 47/724 |
| | | | | 725/110 |
| 2023/0164024 A1 | 5/2023 | Ashwood-Smith et al. | | |
| 2024/0088991 A1* | 3/2024 | Zhu | ...................... | H04B 7/1851 |
| 2025/0167876 A1* | 5/2025 | Watfa | ................. | H04B 7/18541 |

FOREIGN PATENT DOCUMENTS

| | | |
|---|---|---|
| EP | 4283885 A1 | 11/2023 |
| WO | 2022/155886 A1 | 7/2022 |
| WO | 2023/123351 A1 | 7/2023 |

OTHER PUBLICATIONS

Schiller, Eryk, et al. "Toward a live BBU container migration in wireless networks." IEEE Open Journal of the Communications Society 3 (2022): 301-321. (Year: 2022).*
Extended European Search Report received for European Application No. 24194119.4, mailed on Jan. 20, 2025, 11 pages.

* cited by examiner

*Primary Examiner* — Sharad Rampuria
(74) *Attorney, Agent, or Firm* — SHOOK, HARDY & BACON L.L.P.

(57)     ABSTRACT

The technology disclosed herein relates to enhancing satellite coverage and improving user device experiences. For example, the technology discussed herein can include establishing a radio resource control (RRC) connection between a satellite and a user device (e.g., an active or idle RRC connection). Based on the RRC connection, the satellite can generate a message (e.g., an RRC connection release message) that includes a time to live parameter within a spare field of the message. Based on the satellite transmitting the time to live parameter to the user device, the user device can initiate one or more user device actions. For example, the user device can initiate a timer corresponding to scanning for a frequency band.

20 Claims, 7 Drawing Sheets

300

Direction: E-UTRAN to UE

*RRCConnectionRelease message*

```
-- ASN1START

RRCConnectionRelease ::=                    SEQUENCE {
    rrc-TransactionIdentifier               RRC-TransactionIdentifier,
    criticalExtensions                      CHOICE {
        c1                                      CHOICE {
            rrcConnectionRelease-r8                 RRCConnectionRelease-r8-IEs,
            spare3 NULL, spare2 NULL, spare1 NULL
        },
        criticalExtensionsFuture                SEQUENCE {}
```

TRANSMIT AN RRC CONNECTION REQUEST TO A SATELLITE ～402

ESTABLISH AN RRC CONNECTION WITH THE SATELLITE ～404

RECEIVE A MESSAGE FROM THE SATELLITE THAT INCLUDES A TIME TO LIVE PARAMETER WITHIN A SPARE FIELD OF THE MESSAGE ～406

CAUSE AN ACTION BY THE USER DEVICE BASED ON RECEIVING THE TIME TO LIVE PARAMETER ～408

500

ANTICIPATED LOSS OF SATELLITE COVERAGE

CROSS-REFERENCE TO RELATED APPLICATIONS

This application is related to U.S. patent application Ser. No. 18/456,344, filed on Aug. 25, 2023, and entitled "SYSTEM AND METHOD FOR EFFICIENT SCANNING OF SATELLITE COVERAGE UTILIZING 3GPP-BASED SYSTEMS," which is hereby incorporated by reference in its entirety.

SUMMARY

This summary provides a high-level overview of various aspects of the technology disclosed herein, and the detailed-description section below provides further description herein. This summary is not intended to identify key features or essential features of the claimed subject matter, nor is it intended to be used as an aid in isolation to determine the scope of the claimed subject matter. The present disclosure is directed, in part, to technology associated with improved and efficient satellite coverage (e.g., in a 3GPP-based system) based on anticipated loss of satellite coverage, substantially as shown in and/or described in connection with at least one of the figures, and as set forth more completely in the claims.

In aspects set forth herein, and at a high level, the technology described herein relates to generating a message (e.g., corresponding to an RRC connection between a satellite and user device) having particular information within one or more fields of the message (e.g., one or more spare fields), wherein the one or more fields trigger one or more particular user device actions. For example, the particular information within the message may correspond to one or more satellites providing a service to a user device. In an embodiment, one spare field includes a time to live parameter. For example, the time to live parameter can correspond to a remaining duration of time in which the satellite will provide service to the user device. To further illustrate, a user device located within a particular geographical area (e.g., at a particular altitude, at a particular geographical area outside of a threshold range of a terrestrial cell site coverage area) may have a remaining duration of time (e.g., measurable in seconds) in which the user device may utilize a service provided by the satellite. Based on receiving the message having the particular information in the one or more spare fields, the user device can initiate one or more actions.

In embodiments, the user device action triggered by the one or more spare fields may include initiating a timer for scanning frequency bands (e.g., the timer being based on the remaining duration of time in which the satellite will provide service to the user device). In other embodiments, the user device can provide an alert or another type of notification to a user of the user device (e.g., via a graphical user interface) that indicates to the user that one or more services will be unavailable for a particular time period and/or duration. As another example, the user device can initiate additional RRC connections with the satellite to utilize services provided by the satellite before the remaining duration of time, in which the satellite will provide service to the user device, ends. The user device may also initiate other types of user device actions based on the one or more spare fields that include particular information within the message received by the user device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 3 illustrates an example radio resource control connection release message, with generated information in a spare field, for transmission to the user device, in accordance with aspects herein;

DETAILED DESCRIPTION

Figure 1:
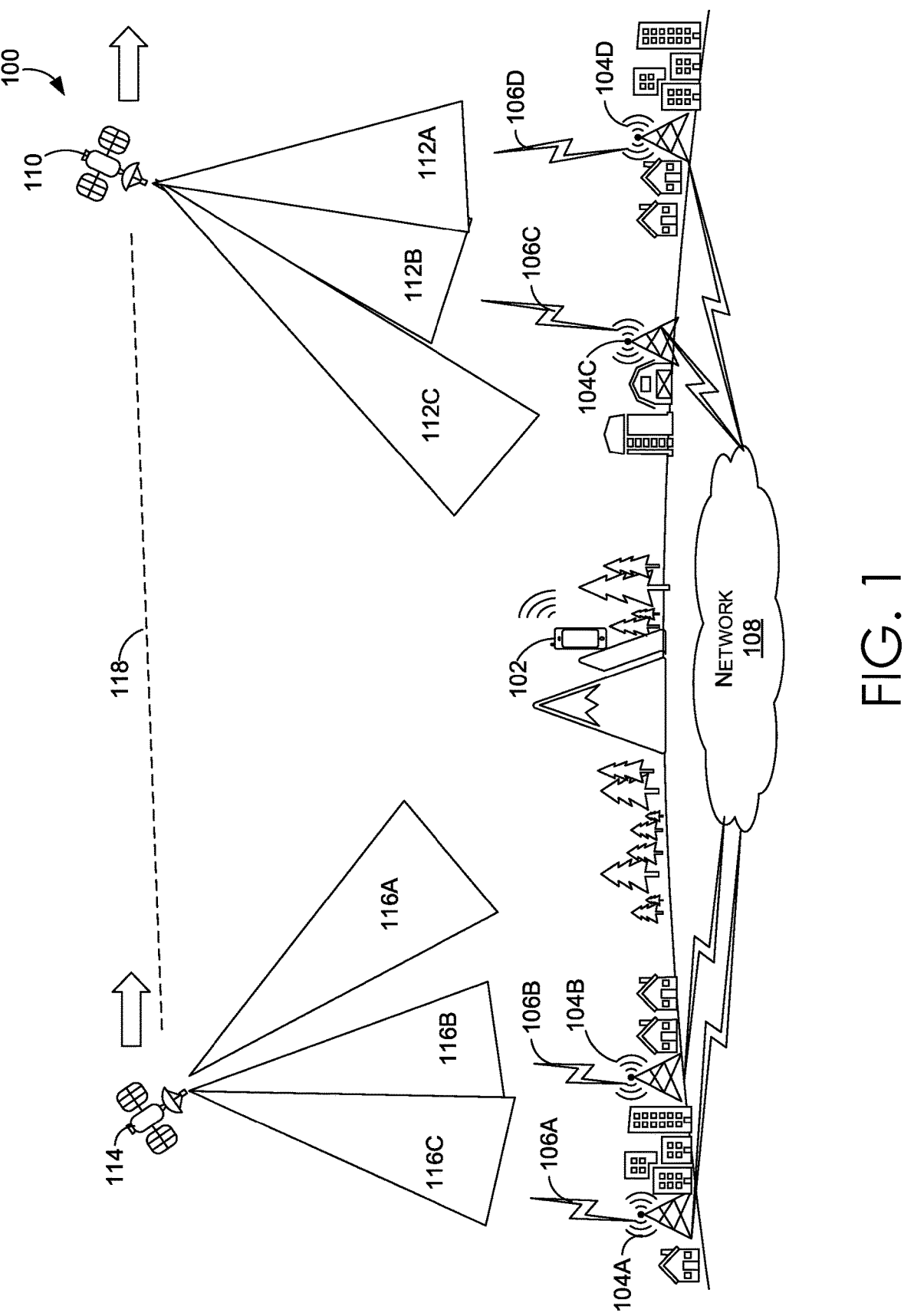
FIG. 1 depicts an example operating environment for improved satellite coverage, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
gNB Next Generation Node B GPRS General Packet Radio Service GSM Global System for Mobile communications DVD Digital Versatile Discs EEPROM Electrically Erasable Programmable Read Only Memory EN-DC E-UTRA NR Dual Connectivity E-UTRA Evolved Universal Terrestrial Radio Access E-UTRAN Evolved Universal Terrestrial Radio Access Network Ev-DO Evolution Data Optimized FD-MIMO Full-Dimension Multiple-Input Multiple-Output GPS Global Positioning System IoT Internet of Things LAN Local Area Network LTE Long Term Evolution MIMO Multiple-Input Multiple-Output mm wave Millimeter wave MME Mobility Management Entity MU-MIMO Multi-User Multiple-Input Multiple-Output NAT Network Access Technology NR New Radio PC Personal Computer PDA Personal Digital Assistant PLMN Public Land Mobile Network RAM Random Access Memory RAN Radio Access Network RF Radio-Frequency ROM Read Only Memory RRC Radio Resource Control RSRP Reference Signal Received Power RSRQ Reference Transmission Receive Quality RSSI Received Signal Strength Indicator SNR Signal-to-Noise Ratio SRS Sound Reference Signal TDMA Time Division Multiple Access VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more." The term "plurality" may refer to "more than one."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.).

Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a millimeter wave transmission may include one or more frequency ranges of 24 GHZ, 26 GHZ, 28 GHZ, 39 GHz, and 52.6-71 GHz.

The term "NAT," as used herein, is synonymous with wireless communication protocol and is an umbrella term used to refer to the particular technological standard/protocol that governs the communication between a UE and a base station. Examples of a NAT may include 3G, 4G, 5G, 6G, 802.11x, another type of NAT, or one or more combinations thereof.

Additionally, a "user device," as used herein, is a device that has the capability of transmitting or receiving one or more signals to or from an access point, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal). A user device may be, in an embodiment, user device 102 described herein with respect to FIG. 1, user device 202 described herein with respect to FIG. 2, or user device 700 described herein with respect to FIG. 7.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof.

In some aspects, the user device is a wearable device having a camera, microphone, RFID, GPS, another sensor, or one or more combinations thereof. A wearable device (or another type of user device) can transmit the data obtained by their corresponding sensor(s) (e.g., to another user device, to a server). In embodiments, a user device can access sensors, application data, tracking data, map data, other user device data, or one or more combinations thereof, for packet transmissions (e.g., to another user device). In some embodiments, a wearable device can be a watch-type electronic device, a glasses-type wearable device, an upper-torso wearable device, another type of wearable device, or one or more combinations thereof.

In embodiments, a user device discussed herein may be configured to communicate using one or more of 4G (e.g., LTE), 5G, 6G, another generation communication system, or one or more combinations thereof. In some aspects, the user device may be an EN-DC user device. In some embodiments, the user device can connect to a 5G gNB that acts as a master node, and another type of node that acts as a secondary node.

A "wireless telecommunication service" refers to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mm wave communication, and mobile communication. Embodiments of the present technology may be used with different wireless telecommunication technologies or standards, including, but not limited to, CDMA 1xAdvanced, GPRS, Ev-DO, TDMA, GSM, WiMAX technology, LTE, LTE Advanced, other technologies and standards, or one or more combinations thereof. For example, in an embodiment, the present technology discussed herein may be used in a 3GPP-based system.

A "network" (e.g., network 108 of FIG. 1) can provide one or more wireless telecommunication services and may transmit or receive a wireless signal to or from a user device. In embodiments, a network may be one or more telecommunications networks, or a portion thereof. The network might include an array of devices or components (e.g., one or more base stations). Additionally or alternatively, the network can include multiple networks, and the network can be a network of networks. In embodiments, the network or a portion thereof may be a core network, such as an evolved packet core or 5G core, which may include a control plane entity (e.g., a mobility management entity), a user plane entity (e.g., a serving gateway), and an access and mobility management function. In some embodiments, the network may comprise one or more public or private networks—wherein one or more of which may be configured as a satellite network (e.g., a 3GPP non-terrestrial network), a publicly switched telephony network, a cellular telecommunications network, another type of network, or one or more combinations thereof.

In embodiments, the network may comprise the satellite network connecting one or more gateways (e.g., a device or a system of components configured to provide an interface between the network and a satellite) to other networks, a cellular core network (e.g., a 4G, 5G, of 6G core network, an IMS network, and the like), a data network, another type of network, or one or more combinations thereof. In such embodiments, each of the satellite network and the cellular core network may be associated with a network identifier, such as a public land mobile network, a mobile country code, a mobile network code, or the like, wherein the network identifier associated with the satellite network is the same or different than the network identifier associated with the cellular network.

In embodiments, the network (including the satellite network) can connect one or more user devices to a service provider for services such as 5G and LTE, for example. In aspects, a service provided to a user device may comprise one or more of a voice service, a message service (e.g., SMS messages, MMS messages, instant messaging messages, an EMS service messages), a data service, other types of wireless telecommunication services, or one or more combinations thereof. The network can comprise any communication network providing voice, message, or data service (s), such as, for example, a 1x circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof. Components of the network, for example, may include terminals, links, gateways, nodes (e.g., a core network node), relay devices, integrated access and backhaul nodes, other types of network components, or one or more combinations thereof.

As used herein, the term "base station" refers to a centralized component or system of components configured to wirelessly communicate (e.g., receive and/or transmit signals) with various devices or components (e.g., a user device, a relay device) in a particular geographical area. A base station may be referred to as one or more cell sites, nodes, gateways, remote radio unit control components, base transceiver stations, access points, NodeBs, eNBs, gNBs, Home NodeBs, Home eNodeBs, macro base stations, small cells, femtocells, relay base stations, another type of base station, or one or more combinations thereof. A base station may be, in an embodiment, similar to base stations 104A-104D described herein with respect to FIG. 1.

The term "satellite," as used herein, is an extraterrestrial base station that is distinguished from a terrestrial base station on the basis of its lack of ground coupling. Some examples of a satellite can include a space satellite, a balloon, a dirigible, an airplane, a drone, an unmanned aerial vehicle, a geosynchronous or geostationary earth orbit satellite, a low earth orbit satellite, a medium earth orbit satellite, a bent-pipe satellite, a regenerative satellite, another type of satellite, or one or more combinations thereof. A satellite may be, in an embodiment, similar to satellites 110 and 114 described herein with respect to FIG. 1, similar to satellites 204 and 206 described herein with respect to FIG. 2, or similar to satellite 602 described herein with respect to FIG. 6.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Satellite RANs will be/are being integrated with cellular telecommunication networks (e.g., in a 3GPP-based system). In various topographies of a terrestrial geographical area, as well as during early phases of satellite deployments, there may be locations where a user device will be beyond the reach of a terrestrial RAN or a satellite RAN. Unlike stationary terrestrial base stations, connections between a UE and a satellite are subject to movement of the satellite station. Further, unlike a terrestrial base station's coverage beam, a satellite's coverage beam may not sweep across the ground as the satellite traverses overhead and instead remains fixed over a given terrestrial geographical area. Furthermore, because of the ubiquitous network coverage between home PLMN and roaming PLMNs, a UE rarely expects to wholly depart a wireless coverage area-meaning that disruptions due to a lack of coverage are typically anomalous and temporary. As such, particularly during early deployments of satellite coverage, a UE well beyond terrestrial coverage areas is likely to experience intermittent periods of satellite coverage.

The integration of the satellite RANs with cellular telecommunication networks can result in high traffic load or congestion from numerous information relay and forwarding that can cause latency for UEs. Additionally or alternatively, this latency can result for user devices within a terrestrial geographical area where the UE is temporarily out of satellite coverage from the satellite's coverage beam remaining fixed over the terrestrial geographical area. As such, if a user needs to make a call or establish a data session (e.g., for Internet browsing, a messaging service, Voice over IP, gaming, High Frequency Trading) via a user device, then it would be helpful for the user to know when the user device will be within a satellite coverage area and when the user device will not be within the satellite coverage area. Furthermore, it may be advantageous to notify users or take some action at the UE in order to take advantage of limited coverage windows.

Accordingly, aspects of the present disclosure are directed to improved systems that include one or more satellites, wherein these improved systems can generate a message (e.g., corresponding to an RRC connection between a satellite and user device) having particular information within one or more fields of the message (e.g., one or more spare fields), such that the one or more fields trigger one or more particular user device actions that correspond to the UE having temporary out-of-satellite-coverage. In this way, users of user devices can better plan the timing and duration of calls and data sessions. Additionally, the technology disclosed herein also provides for reduced user device battery consumption and reduction of expended resources due to the user device reducing the exhaustive scanning of supported technologies, bands, and frequencies in an effort to find coverage, since the particular information in the spare field(s) can provide user devices with the data corresponding to the temporary out-of-satellite-coverage (e.g., a time to live parameter). Furthermore, the technology disclosed herein can improve communications between or among user devices (and/or other devices) by improving quality of service and user experience. In this way, the technology and corresponding techniques disclosed herein can enhance the reliability and functionality of communications.

In an embodiment, a system is provided for enhancing satellite coverage. The system comprises one or more processors corresponding to a satellite and computer memory storing computer-usable instructions that, when executed by the one or more processors, cause the one or more processors to perform operations. The operations comprise establishing a radio resource control (RRC) connection between the satellite and a user device. The operations also comprise transmitting, based on the RRC connection, a message (e.g., an RRC connection release message) to the user device, the message including a time to live parameter within a spare field that corresponds to a remaining duration of time in which the satellite will provide a service to the user device, via a frequency band, within a particular geographical area.

In another embodiment, a method is provided for enhancing satellite coverage. The method comprises establishing a first radio resource control (RRC) connection between a satellite and a user device located within a particular geographical area. The method also comprises transmitting a message to the user device, the message including a time to live parameter within a spare field that corresponds to a future time that the satellite will stop providing a service to the user device, via a frequency band, within the particular geographical area.

Another embodiment includes one or more non-transitory computer storage media having computer-executable instructions embodied thereon, that when executed by at least one processor, cause the at least one processor to perform a method. The method comprises establishing, via a user device located at a particular geographical area, a radio resource control (RRC) connection with a satellite. The method also comprises receiving, via the user device, a message including data within a spare field that corresponds to a future time that the satellite will stop providing a service to the user device within the particular geographical area. The method also comprises causing an action by the user device based on receiving the message.

Turning now to FIG. 1, example operating environment 100 is illustrated in accordance with one or more embodiments disclosed herein. At a high level, the example operating environment 100 comprises user device 102, base stations 104A-104D, communication links 106A-106D corresponding to base stations 104A-104D and satellites 110 and 114, network 108, satellite beams 112A-112C corresponding to the satellite 110, satellite beams 116A-116C corresponding to satellite 114, and communication link 118 corresponding to satellites 110 and 114. Example operating environment 100 is but one example of a suitable environment for the technology and techniques disclosed herein, and is not intended to suggest any limitation as to the scope of use or functionality of the invention. Neither should the environment 100 be interpreted as having any dependency or requirement relating to any one or combination of components illustrated. For example, other embodiments of example operating environment 100 may have more or less base stations or satellites. As another example, even though the user device 102 is illustrated in example operating environment 100 as a mobile phone, the user device 102 may also be another type of user device (e.g., a tablet, a wearable device). In yet another example, even though the satellites 110 and 114 are illustrated in example operating environment 100 as satellite vehicles, the satellites 110 or 114 may also be another type of satellite (e.g., a balloon or high altitude platform station, a dirigible, an airplane, a drone, an unmanned aerial vehicle).

User device 102 may be configured to wirelessly communicate (e.g., by transmitting or receiving one or more signals) with one or more base stations (e.g., base station 104A-104D), one or more satellites (e.g., satellites 110 and 114), other types of wireless telecommunication devices (e.g., core network nodes), or one or more combinations thereof. In example environment 100, network 108, base stations 104A-104D, satellites 110 and 114, or one or more combinations thereof, can provide one or more services (e.g., a data service (e.g., for Internet browsing, a Wi-Fi messaging service, Voice over IP, gaming, High Frequency Trading), a message service (e.g., SMS messages, MMS messages), an EMS service) to the user device 102.

In embodiments, the user device 102 may include one or more of a unit, a station, a terminal, or a client, for example. In some embodiments, the user device 102 may act as a relay. In some embodiments, the user device 102 may be a wireless local loop station, an IoT device, an Internet of Everything device, a machine type communication device, an evolved or enhanced machine type communication device, another type of user device, or one or more combinations thereof. As illustrated in example operating environment 100, the user device 102 is located within a particular terrestrial geographical area on a mountain. In other embodiments, the user device 102 may be located in a hot air balloon, on an airplane, or another system capable of transporting the user device to various altitudes.

The base stations 104A-104D in example environment 100 are dispersed throughout various geographical areas, and in some embodiments, the base stations 104A-104D can be in different forms or can have different capabilities. For example, base station 104C is dispersed in a rural geographical area and base station 104D is dispersed in an urban geographical area. Further, the base stations 104A-104D may perform one or more of the following functions: transfer user data, radio channel ciphering, radio channel deciphering, integrity protection, header compression, mobility control functions (e.g., handover, dual connectivity), inter-cell interference coordination, connection setup and release, load balancing, distribution for non-access stratum messages, non-access stratum node selection, synchronization, RAN sharing, multimedia broadcast multicast service, subscriber and equipment trace, RAN information management, paging, positioning, delivery of a warning message, another type of base station functionality, or one or more combinations thereof. Even though the base stations 104A-104D are illustrated in example operating environment 100 as macro base stations, one or more of the base stations 104A-104D may also be another type of base station (e.g., a gateway node, such as a satellite dish).

Further, in some embodiments, one or more of base stations 104A-104D may communicate directly or indirectly (e.g., through the EPC 160 or 5G Core 190) with another base station over a backhaul link (e.g., using an X2 interface), which may be wired or wireless. In embodiments, one or more of the communication links 106A-106D (e.g., a feeder link) can connect one or more of the satellites 110 and 114 to the network 108 (e.g., a 5G network or another generation network). In other embodiments, one or more of satellites 110 and 114 can connect to the network 108 directly. As another example, in other embodiments, one or more of satellites 110 and 114 can connect to a separate terrestrial gateway via a feeder link.

In some embodiments, one or more of satellites 110 and 114 can connect to the network 108 via a network node embarked onboard the satellite 110 or satellite 114. For example, in embodiments wherein satellite 110 or satellite

114 has the one or more network nodes embarked onboard, the network node can connect to the user device 102 via a service link using a Uu interface. In yet another example, one or more of the satellites 110 and 114 may have one or more access nodes, such as one or more gNB components (e.g., a gNB distributed unit) onboard the satellite. Accordingly, the user device 102 can transmit or receive signals to or from one or more of the satellites 110 and 114.

The user device 102, in some embodiments, can transmit or receive signals to or from the satellite 110 or the satellite 114 via one or more frequency bands (e.g., via satellite beam 112C corresponding to satellite 110 or satellite beam 116A corresponding to satellite 114). In embodiments, within each of the satellite beams 112A-112C and 116A-116C, each of the satellite 110 or satellite 114 may utilize one or more frequencies to wirelessly communicate with user devices. In some embodiments, two or more of the satellite beams 112A-112C of satellite 110 or two or more of satellite beams 116A-116C of satellite 114 have an angular spread that is close to zero. In embodiments, the satellite beams 112A-112C of satellite 110 or the satellite beams 116A-116C of satellite 114 have large-scale parameters (line-of-sight probability, angular spread, delay spread, etc.) that depend on the elevation angle of their respective satellite. In embodiments, path loss corresponding to one or more of the satellite beams 112A-112C or satellite beams 116A-116C and the user device 102 is based on attenuation from an object (e.g., a mountain or building structure) having an altitude, absorption by one or more atmospheric gases (e.g., nitrogen, oxygen, argon, carbon dioxide, neon, helium, methane, krypton, ozone, hydrogen, water vapor), ionospheric and tropospheric scintillation loss, a period of time (e.g., during a particular day) of high solar activity, satellite orbit, carrier frequency, elevation angle, another type of path loss factor, or one or more combinations thereof.

The user device 102 can establish an RRC connection with satellite 110 or satellite 114. For example, the user device 102 can transmit an RRC connection request or another type of request to satellite 110 or satellite 114. In some embodiments, the user device 102 can transmit an RRC connection request to satellite 110 based on a frequency band identifier of a frequency band corresponding to satellite beam 112C or frequency band properties of a frequency band corresponding to satellite beam 112C. Additionally or alternatively, the user device 102 can transmit an RRC connection request to satellite 114 based on a frequency band identifier of a frequency band associated with satellite beam 116A or frequency band properties of the frequency band associated with the satellite beam 116A. Based on transmitting the RRC connection request or the other type of request, the user device 102 will monitor for one or more messages (e.g., an RRC Connection Setup, an RRC Connection Resume, an RRC Early Data Complete, an RRC Connection Release).

In embodiments, the user device 102 (e.g., having global navigation satellite system capabilities) can determine a relative signal speed between the user device 102 and the satellite 110 or satellite 114 or a round-trip time. For example, the user device 102 can determine a signal speed associated with the RRC connection request, the RRC connection setup message, the RRC connection release message, etc. As another example, in some embodiments, the user device 102 can determine a pre-compensation for a Doppler frequency for uplink transmissions to the satellite 110 and another pre-compensation for a Doppler frequency for uplink transmissions to the satellite 114. In this way, the user device 102 can monitor for the for one or more messages (e.g., an RRC Connection Setup, an RRC Connection Resume, an RRC Early Data Complete, an RRC Connection Release) based on determining the relative signal speed, round-trip time, another monitoring factor, or one or more combinations thereof. As another example, the user device can transmit the RRC connection request, another type of request, or other types of uplink data to the satellite 110 or 114 based on determining the pre-compensation for the Doppler frequency.

Additionally, the satellites 110 and 114 can broadcast services and provide coverage for user devices (e.g., IoT devices), provide mission critical access (e.g., during an emergency situation), provide other types of satellite services, protocols, or functionality, or one or more combinations thereof. In embodiments, satellites 110 and 114 can be configured to communicate with each other (e.g., via communication link 118). For example, the communication link 118 may include a free space optical link, a microwave link, electromagnetic wave signals via mm wave signals, optical signals via a laser, another type of communication link, or one or more combinations thereof. As another example, the communication link 118 can correspond to a wireless common public radio interface protocol, a dedicated wireless front haul protocol developed for high-altitude-to-high-altitude, another protocol, or one or more combinations thereof. In some embodiments, the satellite 114 can transmit a frequency band identifier that identifies a frequency band for satellite beam 116A, 116B, or 116C (e.g., a carrier frequency in MHz or channel number frequency range) to the satellite 110 via the communication link 118.

In embodiments, based on the satellite 110 establishing an RRC connection with the user device 102 (or based on receiving an RRC connection request from the user device, for example), the satellite 110 can transmit a message (e.g., an RRC connection release message) to the user device 102, the message including a time to live parameter within a field (e.g., one or more spare fields) of the message, wherein the time to live parameter corresponds to a remaining duration of time in which the satellite 110 will provide a service to the user device 102, via satellite beam 112C, within the particular geographical area (e.g., a particular geographical area corresponding to a mountainous region) in which the user device 102 is located. In a different embodiment, based on the satellite 114 establishing an RRC connection with the user device 102 (or based on receiving an RRC connection request from the user device, for example), the satellite 114 can transmit a message (e.g., an RRC connection release message) to the user device 102, the message including a time to live parameter within a spare field of the message, wherein the time to live parameter corresponds to a remaining duration of time in which the satellite 114 will provide a service to the user device 102, via satellite beam 116A, within the particular geographical area in which the user device 102 is located. In some embodiments, the remaining duration of time within the spare field is in seconds.

In some embodiments, after transmitting the message having the time to live parameter, the satellite 110 or 114 can also transmit a second message to the user device 102 (e.g., another RRC connection release message) within a threshold period of time corresponding to the remaining duration of time, the second message including an updated time to live parameter within a spare field of the second message, wherein the updated time to live parameter is a shorter time than the time to live parameter in the initial message. For example, in some embodiments, the satellite 110 or 114 can transmit the second message to the user device 102 based on establishing a second RRC connection with the user device 102 or based on receiving an RRC connection resume request from the user device 102.

In some embodiments, the time to live parameter is transmitted to the user device 102 based on determining a location or an anticipated course (e.g., an area on a path of a mountain having one or more trees obstructing signals from the satellite beam 112C of satellite 110 providing service to the user device) of the user device 102. For example, the time to live parameter may be determined based on the user device 102 being located within a particular geographical coverage area associated with a network node. In some embodiments, the satellite 110 transmitting the time to live parameter to the user device 102 may determine the location of the user device 102 based on circuitry processing resources of the user device 102 corresponding to location related measurements obtained by the user device 102. As another example, the location of the user device 102 (e.g., associated with a latitude and longitude of the user device 102) can be determined based on a Satellite Positioning System or Global Navigation Satellite System, such as GPS, GLObalnaya NAvigatsionnaya Sputnikovaya Sistema, Galileo, BeiDou, Indian Regional Navigation Satellite System, European Geostationary Navigation Overlay Service, Wide Area Augmentation System, another similar positioning technique, or one or more combinations thereof.

In some embodiments, the location of the user device 102 can be determined by satellite 110 based on the satellite 110 receiving an RRC connection request from the user device 102. For example, the satellite 110 can determine the location of the user device 102 in response to receiving the RRC connection request. As another example, the satellite 110 can determine the location based on the user device 102 transmitting location data to the satellite 110 with the RRC connection request. In some embodiments, the satellite 110 can transmit the time to live parameter, for servicing the user device 102, to the satellite 114 via the communication link 118.

In some embodiments, the time to live parameter is determined (e.g., by the satellite 110, satellite 114, satellite network components onboard the respective satellite) based on large-scale parameters (line-of-sight probability, angular spread, delay spread, etc.) and an elevation angle of the respective satellite and corresponding frequency band. In one example, the time to live parameter transmitted by the satellite 110 servicing the user device 102 via the satellite beam 112C is based on a large scale parameter and elevation angle corresponding to the satellite 110 and the satellite beam 112C. As another example, in some embodiments, the time to live parameter is determined based on path loss associated with the satellite beam 112C and attenuation from an object (e.g., a tree on a mountain) having a particular altitude. In some embodiments, the time to live parameter is determined based on absorption by one or more atmospheric gases (e.g., nitrogen, oxygen, argon, carbon dioxide, neon, helium, methane, krypton, ozone, hydrogen, water vapor), a concentration of one or more of those atmospheric gases, a carrier frequency of the satellite beam 112C, ionospheric and tropospheric scintillation loss, solar activity levels, an orbit of the satellite 110, another factor corresponding to the satellite beam 112C, or one or more combinations thereof.

Figure 2:
FIG. 2 depicts another example operating environment for improved satellite coverage, in accordance with aspects herein.
Figure 2:
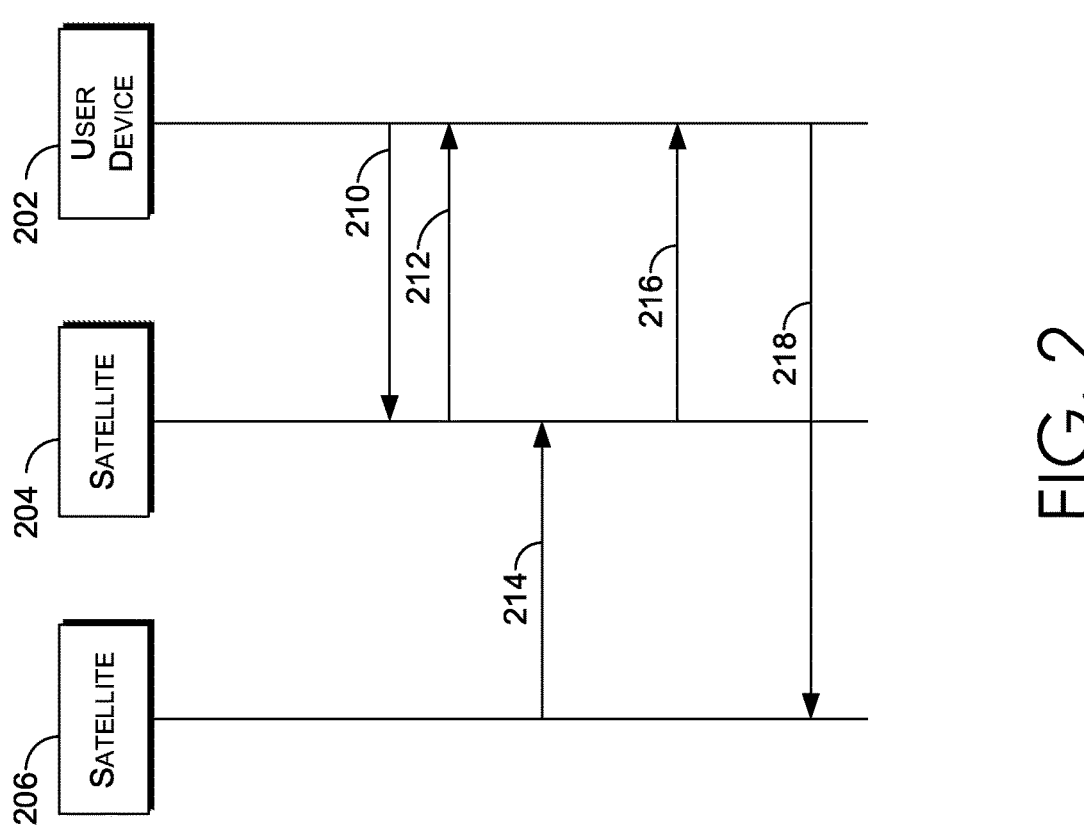

Turning to FIG. 2, example operating environment 200 includes user device 202, a first satellite 204, a second satellite 206, and transmissions 210-218. Example operating environment 200 is but one example of a suitable environment for the technology and techniques disclosed herein, and is not intended to suggest any limitation as to the scope of use or functionality of the invention. Neither should the environment 200 be interpreted as having any dependency or requirement relating to any one or combination of components illustrated. For example, other embodiments of example operating environment 200 may have more or less user devices or satellites. As another example, even though the transmission 214 from the second satellite 206 is illustrated as occurring after the 212 transmission from the first satellite 204, the transmission 214 may occur at a different time relative to the 212 transmission (e.g., before the 212 transmission). In yet another example, even though the transmission 214 from the second satellite 206 is illustrated as occurring before the 216 transmission from the first satellite 204, the transmission 214 may occur at a different time relative to the 216 transmission (e.g., after the 216 transmission).

Figure 6:
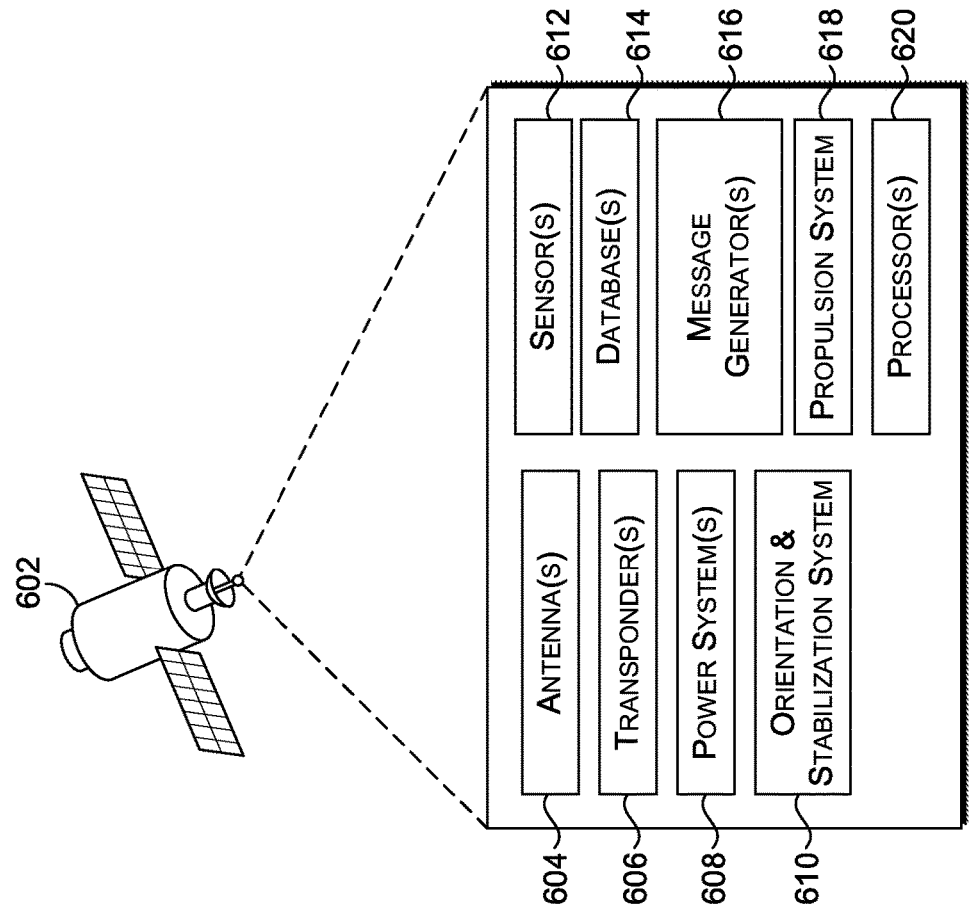
FIG. 6 depicts an example satellite for use in implementations of the present disclosure, in accordance with aspects herein.
Figure 7:
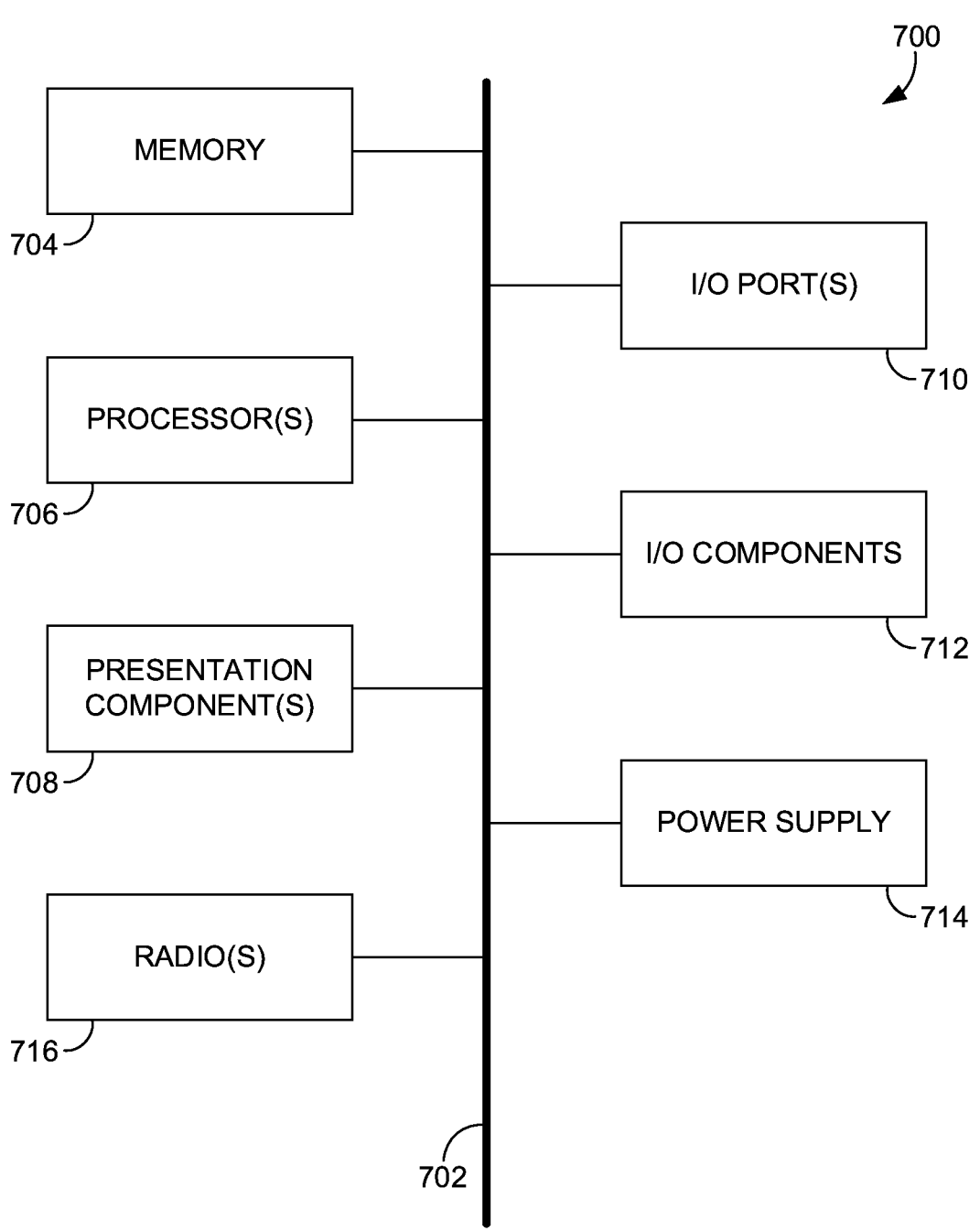
FIG. 7 depicts an example user device suitable for use in implementations of the present disclosure, in accordance with aspects herein.

User device 202, in embodiments, may be the user device 102 of FIG. 1 or the user device 700 of FIG. 7. In some embodiments, the first satellite 204 may be the satellite 110 of FIG. 1 or the satellite 602 of FIG. 6. In some embodiments, the second satellite 206 may be the satellite 114 of FIG. 1 or the satellite 602 of FIG. 6.

In example operating environment 200, the user device 202 transmits an RRC connection request to the first satellite 204 via transmission 210. Based on the RRC connection request, the first satellite 204 establishes an RRC connection with the user device 202 via transmission 212. The second satellite 206 transmits data via transmission 214 corresponding to a frequency band of the second satellite 206 (e.g., frequency band corresponding to satellite beam 116A of satellite 114 in FIG. 1) and the user device 202. Based on establishing the RRC connection with the user device 202, the first satellite 204 transmits a message to the user device 202 via transmission 216, the message including a time to live parameter within a field (e.g., one or more spare fields) of the message. In some embodiments, the time to live parameter corresponds to a future time that the first satellite 204 will stop providing a service to the user device 202, via a frequency band, within a particular geographical area in which the user device 202 is located. In some embodiments, the time to live parameter corresponds to a remaining duration of time in which the satellite will provide the service to the user device, via the frequency band, within the particular geographical area. In some embodiments, the message also includes one or more additional fields (e.g., one or more additional spare fields) having the data from transmission 214 corresponding to the frequency band of the second satellite 206 and the user device 202. Based on receiving the time to live parameter, the user device 202 initiates an action. For example, the action may include transmitting an RRC connection request to the second satellite 206 via transmission 218 upon expiration of the time to live parameter. In some embodiments, the action initiated by the user device 202 is also based on the one or more other spare fields having the information from transmission 214.

Turning to FIG. 3, example RRC connection release message 300 (e.g., transmitted via E-UTRAN to a user device) having a field (e.g., one or more spare fields) including a time to live parameter. For example, the spare field may include one or more of spare3 NULL, spare2 NULL, spare1 NULL within the example RRC connection release message 300. In an embodiment, a satellite having an RRC connection with the user device (e.g., an active RRC connection or an idle RRC connection) can transmit example RRC connection release message 300 to the user device (e.g., via E-UTRAN), wherein one or more of the spare3 NULL, spare2 NULL, spare1 NULL include the time to live parameter. For example, the time to live parameter can correspond to a future time that the satellite will stop providing a service to the user device within the particular geographical area in which the user device is located. As another example, the time to live parameter can correspond to a remaining duration of time in which the satellite will provide a service to the user device, via a frequency band, within the particular geographical area.

By way of illustration and as a non-limiting example, the user device can establish an RRC connection with the satellite at 12:00 pm Eastern Time Zone corresponding to the United States. At 12:00:30 pm, the satellite sends the RRC connection release message 300 to the user device with the time to live parameter being 30 seconds. In this way, the user device is informed that the satellite will provide coverage to the user device until 12:01 pm. Based on the time to live parameter, the user device can initiate the action of setting an internal timer for thirty seconds, another action of notifying the user (e.g., via a graphical user interface, via an audible notification) how much time they have left to transmit a message or otherwise utilize a service provided by the satellite. Based on providing the user with the notification of the remaining service time and based on receiving one or more inputs, selections, or other operations from the user of the user device, the user device and utilize a service (e.g., transmit an SMS message) of the satellite before the remaining thirty seconds have ended. As another example, based on the user device transmitting the SMS message before the remaining duration of time in which the satellite will provide the service to the user device ends, the satellite can transmit another message (e.g., another RRC connection release message) that includes an updated time to live parameter within a spare field (e.g., the updated time to live parameter being 15 seconds until the satellite will stop providing service to the user device).

Based on receiving the time to live parameter, the user device can set the internal timer such that the user device will not scan for any technologies, bands, frequencies, etc. until the remaining duration of time ends or until after the future time that the satellite will stop providing service to the user device. In this way, the user device preserves battery resources and other resource capabilities and thereby enhancing battery life, component functionality, and user device experience. Additionally, this also allows for users of user devices to better plan for timing and duration of calls and data sessions. As such, the present technology and corresponding techniques further enhance the reliability and functionality of communications.

Example Flowcharts

Figure 4:
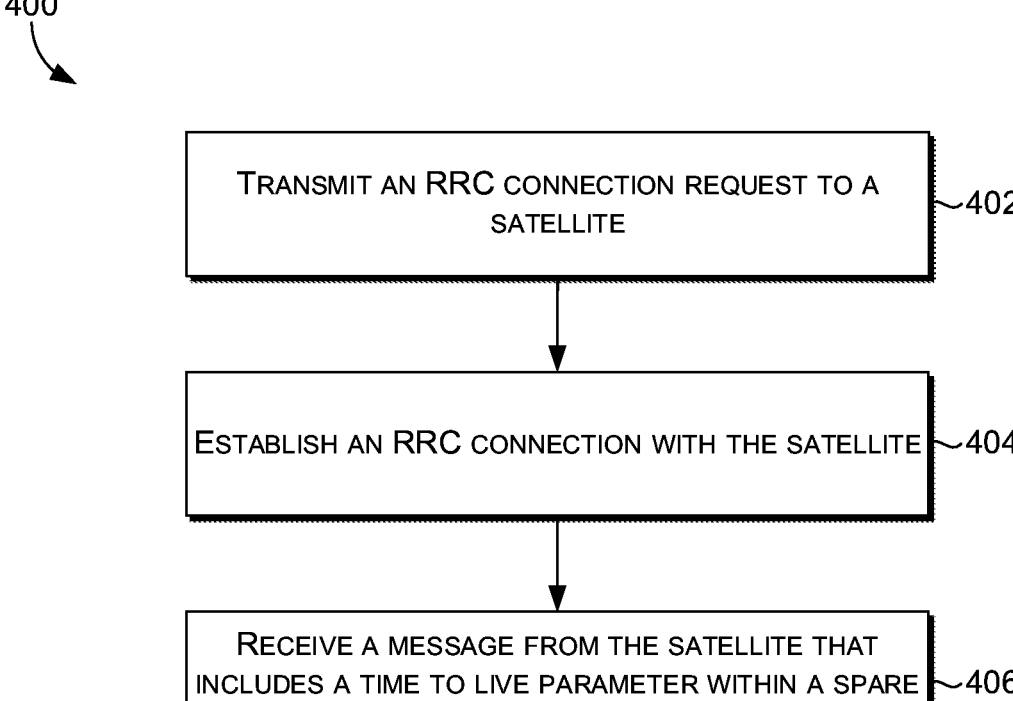
FIG. 4 illustrates an example flowchart for improved satellite coverage from the perspective of a user device, in accordance with aspects herein.

Having described the example embodiments discussed above, an example flowchart is described below with respect to FIG. 4. Example flowchart 400 begins at 402 with the user device transmitting an RRC connection request to a satellite (e.g., based on 3GPP TS 36.331 version 15.3.0 Release 15). At 404, the user device can establish a first RRC connection with the satellite based on the RRC connection request. Based on establishing the RRC connection with the satellite, at 406, the user device can receive a message including a time to live parameter within a spare field. In embodiments, the time to live parameter corresponds to a future time (e.g., indicating a specific time in the future) that the satellite will stop providing service to the user device within the particular geographical area in which the user device is located. In some embodiments, the time to live parameter corresponds to remaining duration of time in which the satellite will provide a service to the user device, via a frequency band, within the particular geographical area. The time to live parameter can be in seconds, milliseconds, nanoseconds, another type of time measurement or time unit, etc. At 408, the user device can initiate an action based on receiving the time to live parameter.

In embodiments, the user device action can include initiating a timer corresponding to scanning for a frequency band, the timer based on the future time that the satellite will stop providing the service or the remaining duration of time in which the satellite will provide service to the user device. In some embodiments, the action includes providing an alert via a user interface of the user device, the alert indicating to a user of the user device when service will not be provided to the user device by the satellite (e.g., the alert indicating that the service will not be provided at the future time or after the remaining duration of time). In some embodiments, the action includes transmitting another RRC connection request to the satellite prior to the future time that the satellite will stop providing the service to the user device or prior to the remaining duration of time ending. In some embodiments wherein the action includes transmitting the additional RRC connection request, the user device can also receive an RRC connection release message from the satellite prior to the future time or prior to the remaining duration of time ending. For example, the RRC connection release message received prior to the future time or prior to the remaining duration of time ending can include an updated time to live parameter within a spare field of that RRC connection release message.

Figure 5:
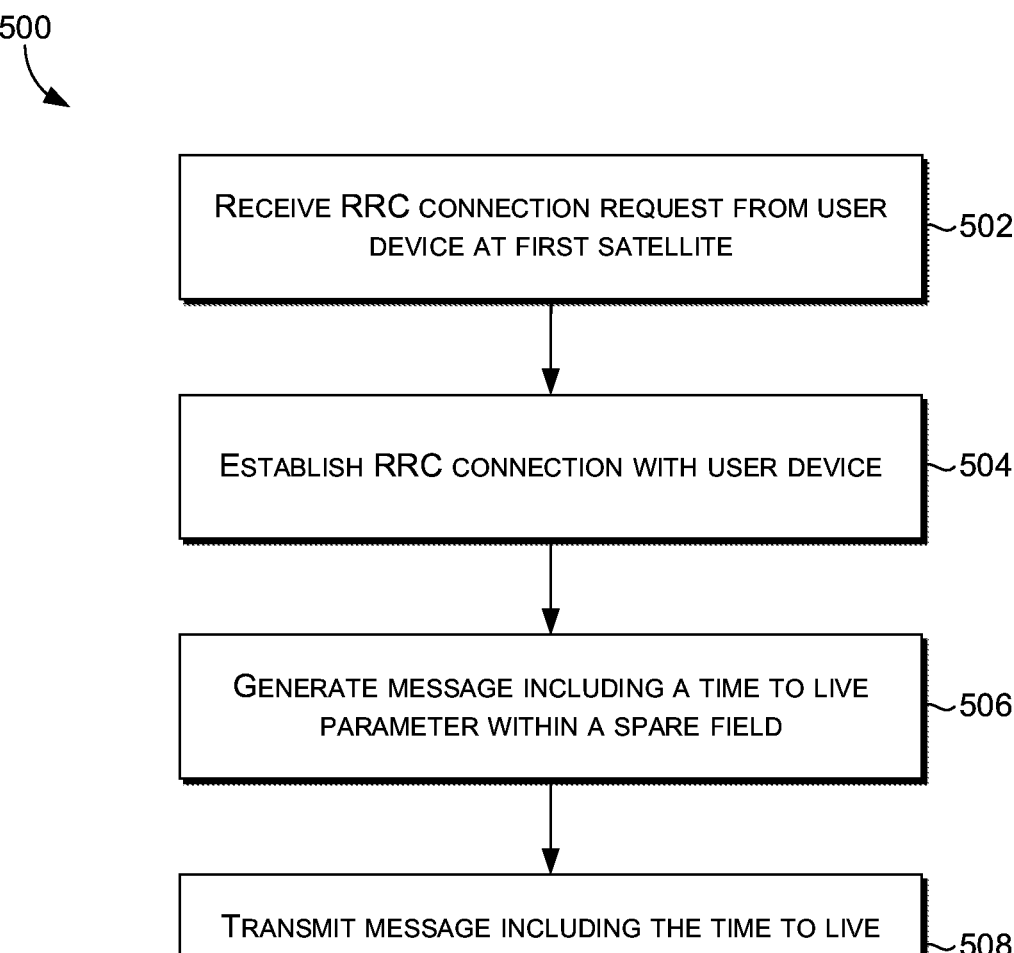
FIG. 5 illustrates an example flowchart for improved satellite coverage from the perspective of a satellite, in accordance with aspects herein.

Turning to FIG. 5, example flowchart 500 begins at 502 with a satellite receiving an RRC connection request from a user device. Based on receiving the RRC connection request, the satellite at 504 establishes a first RRC connection with the user device located within a particular geographical area. At 506, the satellite generates a message including a time to live parameter within a spare field of the message. For example, the time to live parameter can correspond to a future time that the satellite will stop providing service to the user device or a remaining duration of time in which the satellite will provide service to the user device. In some embodiments, the time to live parameter is determined based on large-scale parameters (line-of-sight probability, angular spread, delay spread, etc.) and an elevation angle of the satellite relative to the position of the user device, path loss associated with a frequency band of the satellite providing the service, attenuation from an object (e.g., a tree on a mountain), an absorption by one or more atmospheric gases (e.g., nitrogen, oxygen, argon, carbon dioxide, neon, helium, methane, krypton, ozone, hydrogen, water vapor) between the user device and satellite, ionospheric scintillation loss, tropospheric scintillation loss, a solar activity level, an orbit of the satellite, another time to live factor, or one or more combinations thereof.

At 508, the satellite transmits the message including the time to live parameter to the user device. In some embodiments, prior to the future time that the satellite will stop providing the service to the user device, the satellite establishes a second RRC connection between the satellite and the user device. Based on the second RRC connection and prior to the future time that the satellite will stop providing the service to the user device, the satellite transmits a second message to the user device, the second message including an updated time to live parameter within a spare field, the updated time to live parameter corresponding to a shorter time than the time to live parameter in the previous message. In some embodiments, the satellite determines the user device is located within a particular geographical area or outside of a particular geographical coverage area associated with a particular network node, and transmits the message to the user device based on determining the location of the user device.

Example Satellite

Having described the example embodiments discussed above of the presently disclosed technology, an example operating environment of an example satellite (e.g., satellite 110 or 114 of FIG. 1, satellite 204 or 206 of FIG. 2) is described below with respect to FIG. 6. Example environment 600 is but one example of a suitable satellite environment, and is not intended to suggest any particular limitation as to the scope of use or functionality of the technology disclosed. Neither should satellite 602 be interpreted as having any dependency or requirement relating to any particular component illustrated, or a particular combination of the components illustrated in FIG. 6.

As illustrated in FIG. 6, example satellite 602 includes antenna(s) 604, transponder(s) 606, power system(s) 608, an orientation and stabilization system 610, sensor(s) 612, database(s) 614, message generator(s) 616, propulsion system 618, and processor(s) 620. The antenna(s) 604 of the satellite 602 can be configured to communicate with user devices, gateways, other satellites, other nodes, or one or more combinations thereof. The antenna(s) 604 may be based on one or more antenna elements (e.g., monopoles or dipoles, loop antennas, helical antennas, patch antennas, inverted-F antennas, Yagi antennas, slot antennas, horn antennas, cavity antennas) and can be used in one or more antenna arrays (e.g., phased antenna arrays, fixed direct radiating arrays, deployable direct radiating antenna arrays, space fed arrays, reflector fed arrays).

Transceiver circuitry of the satellite 602 may include transponder(s) 606 capable of receiving uplink signals and capable of transmitting downlink signals. For example, the transponder(s) 606 may receive, amplify, or retransmit one or more signals between the satellite 602 and a gateway or user device, for example. As another example, one or more of the transponder(s) 606 can operate within a particular frequency band. In some embodiments, the transponder(s) 606 can perform a bent-pipe transmission. In some embodiments, one or more of the transponder(s) 606 can operate in a single-channel per carrier mode, a time-division multiple access mode, another type of mode, or one or more combinations thereof.

The power system(s) 608 can supply power to the satellite 602. For example, the power system(s) 608 may include one or more solar panels, one or more arrays of solar panels, power regulator circuitry, one or more batteries (e.g., silver zinc cell, lithium cell, solar cell), another type of power system component, or one or more combinations thereof. The power system(s) may also store electrical power generated from solar energy. The orientation and stabilization system 610 can act as a stabilizer (e.g., spin stabilization or three-axis (e.g., yaw axis, roll axis, and pitch axis) stabilization). The orientation and stabilization system 610 may also modify or control the spin and rotation of the satellite 602 (e.g., speed of rotation).

The sensor(s) 612 may include a sun sensor for detecting the director or position of the sun, an earth sensor for detecting the direction or position of the earth, light-based sensors (e.g., infrared sensors, visible light sensors, ultraviolet sensors), LIDAR, radar, backscattered light or backscattered radio-frequency signal sensors, temperature sensors, radiation sensors, accelerometers, gyroscopes, magnetic sensors, spectrometers, microwave sensors, particle detectors, another type of sensor, or one or more combinations thereof. The database(s) 614 may include one or more of a telemetry database, a payload database, an orbital database, a command and control database, a mission planning database, a reference database (e.g., for storing celestial data), a ground station database (e.g., for storing data from communications with terrestrial devices), another type of database, or one or more combinations thereof.

The message generator(s) 616 can generate a message for transmission to user devices. For example, the message generator(s) 616 can generate data within one or more spare fields of the message (e.g., an RRC connection release message). In embodiments, the message generator(s) 616 can generate a message having a time to live parameter within the spare field. The time to live parameter may correspond to a future time that the satellite will stop providing service to the user device or a remaining duration of time in which the satellite will provide service to the user device. In embodiments, the time to live parameter is determined based on one or more of the antenna(s) 604, transponder(s) 606, power system(s) 608, orientation and stabilization system 610, sensor(s) 612, database(s) 614, message generator(s) 616, propulsion system 618, processor (s) 620, or one or more combinations thereof.

The propulsion system 618 can control the orbit of the satellite 602. For example, the propulsion system 618 can correspond to chemical propulsion, electric propulsion, compressed gas propulsion, hybrid propulsion, another type of propulsion, or one or more combinations thereof. The processor(s) 620 can be utilized by or for one or more of the antenna(s) 604, transponder(s) 606, power system(s) 608, orientation and stabilization system 610, sensor(s) 612, database(s) 614, message generator(s) 616, propulsion system 618, another satellite component, or one or more combinations thereof. For example, the processor(s) 620 can process sensor data and determine the time to live parameter. In an example embodiment, the processor(s) 620 can be a central processing unit, a digital signal processor, a field-programmable gate array, a graphics processing unit, a system-on-chip, a radiation-tolerant processor, another type of processor, or one or more combinations thereof.

Example User Device

Having described the example embodiments discussed above of the presently disclosed technology, an example operating environment of an example user device (e.g., user device 102 of FIG. 1) is described below with respect to FIG. 7. User device 700 is but one example of a suitable computing environment, and is not intended to suggest any particular limitation as to the scope of use or functionality of the technology disclosed. Neither should user device 700 be interpreted as having any dependency or requirement relating to any particular component illustrated, or a particular combination of the components illustrated in FIG. 7.

As illustrated in FIG. 7, example user device 700 includes a bus 702 that directly or indirectly couples the following devices: memory 704, one or more processors 706, one or more presentation components 708, one or more input/output (I/O) ports 710, one or more I/O components 712, a power supply 714, and one or more radios 716.

Bus 702 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component, such as a display device, to be an I/O component. Also, processors have memory. Accordingly, FIG. 7 is merely illustrative of an exemplary user device that can be used in connection with one or more embodiments of the technology disclosed herein.

User device 700 can include a variety of computer-readable media. Computer-readable media can be any available media that can be accessed by user device 700 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 704 includes computer storage media in the form of volatile and/or nonvolatile memory. The memory 704 may be removable, non-removable, or a combination thereof. Example hardware devices of memory 704 may include solid-state memory, hard drives, optical-disc drives, other hardware, or one or more combinations thereof. As indicated above, the computer storage media of the memory 704 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 700, or one or more combinations thereof.

The one or more processors 706 of user device 700 can read data from various entities, such as the memory 704 or the I/O component(s) 712. The one or more processors 706 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 706 can execute instructions, for example, of an operating system of the user device 700 or of one or more suitable applications.

The one or more presentation components 708 can present data indications via user device 700, another user device, or a combination thereof. Example presentation components 708 may include a display device, speaker, printing component, vibrating component, another type of presentation component, or one or more combinations thereof. In some embodiments, the one or more presentation components 708 may comprise one or more applications or services on a user device, across a plurality of user devices, or in the cloud. The one or more presentation components 708 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 710 allow user device 700 to be logically coupled to other devices, including the one or more I/O components 712, some of which may be built in. Example I/O components 712 can include a microphone, joystick, game pad, satellite dish, scanner, printer, wireless device, and the like. The one or more I/O components 712 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 708 on the user device 700. In some embodiments, the user device 700 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 700 may, additionally or alternatively, be equipped with accelerometers or gyroscopes that enable detection of motion. In some embodiments, the output of the accelerometers or gyroscopes may be provided to the one or more presentation components 708 of the user device 700 to render immersive augmented reality or virtual reality.

The power supply 714 of user device 700 may be implemented as one or more batteries or another power source for providing power to components of the user device 700. In embodiments, the power supply 714 can include an external power supply, such as an AC adapter or a powered docking cradle that supplements or recharges the one or more batteries. In aspects, the external power supply can override one or more batteries or another type of power source located within the user device 700.

Some embodiments of user device 700 may include one or more radios 716 (or similar wireless communication components). The one or more radios 716 can transmit, receive, or both transmit and receive signals for wireless communications. In embodiments, the user device 700 may be a wireless terminal adapted to receive communications and media over various wireless networks. User device 700 may communicate using the one or more radios 716 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 716 may facilitate communication via radio frequency signals, frames, blocks, transmission streams, packets, messages, data items, data, another type of wireless communication, or one or more combinations thereof. The one or more radios 716 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for enhancing satellite coverage, the system comprising:
one or more processors corresponding to a satellite; and
computer memory storing computer-usable instructions that, when executed by the one or more processors, cause the one or more processors to perform operations comprising:
establishing a radio resource control (RRC) connection between the satellite and a user device; and
based on the RRC connection, transmitting a message to the user device, the message including a time to live parameter within a spare field that corresponds to a remaining duration of time in which the satellite will provide a service to the user device, via a frequency band, within a particular geographical area.

2. The system according to claim 1, wherein the remaining duration of time within the spare field is in seconds.

3. The system according to claim 1, wherein the message is an RRC connection release message.

4. The system according to claim 1, the operations further comprising transmitting a second message to the user device within a threshold period of time corresponding to the remaining duration of time, the second message including an updated time to live parameter within a spare field.

5. The system according to claim 1, wherein the operations further comprise:
prior to the remaining duration of time ending, establishing a second RRC connection with the user device; and
based on the second RRC connection and prior to the remaining duration of time ending, transmitting a second message to the user device, the second message including an updated time to live parameter within a spare field, the updated time to live parameter corresponding to a shorter time than the time to live parameter in the message.

6. The system according to claim 5, wherein the message and the second message are RRC connection release messages.

7. The system according to claim 1, the operations further comprising determining a location of the user device within the particular geographical area, and transmitting the message to the user device based on determining the location of the user device.

8. The system according to claim 7, wherein the location of the user device is determined based on receiving an RRC connection request from the user device.

9. A method for enhancing satellite coverage, the method comprising:
establishing a first radio resource control (RRC) connection between a satellite and a user device located within a particular geographical area; and
transmitting a message to the user device, the message including a time to live parameter within a spare field that corresponds to a future time that the satellite will stop providing a service to the user device, via a frequency band, within the particular geographical area.

10. The method according to claim 9, wherein the time to live parameter within the spare field is in seconds.

11. The method according to claim 9, further comprising:
prior to the future time that the satellite will stop providing the service to the user device, establishing a second RRC connection between the satellite and the user device; and
based on the second RRC connection and prior to the future time that the satellite will stop providing the service to the user device, transmitting a second message to the user device, the second message including an updated time to live parameter within a spare field, the updated time to live parameter corresponding to a shorter time than the time to live parameter in the message.

12. The method according to claim 9, further comprising determining a location of the user device within the particular geographical area, and transmitting the message to the user device based on determining the location of the user device.

13. The method according to claim 9, wherein the message is an RRC connection release message.

14. One or more non-transitory computer storage media having computer-executable instructions embodied thereon, that when executed by at least one processor, cause the at least one processor to perform a method comprising:
establishing, via a user device located at a particular geographical area, a radio resource control (RRC) connection with a satellite;
receiving, via the user device, a message including data within a spare field that corresponds to a future time that the satellite will stop providing a service to the user device within the particular geographical area; and
causing an action by the user device based on receiving the message.

15. The one or more non-transitory computer storage media of claim 14, wherein the action includes initiating a timer corresponding to scanning for a frequency band, the timer based on the future time that the satellite will stop providing the service.

16. The one or more non-transitory computer storage media of claim 14, wherein the action includes providing an alert via a user interface of the user device, the alert indicating to a user of the user device that the service will not be provided at the future time.

17. The one or more non-transitory computer storage media of claim 14, wherein the message is an RRC connection release message.

18. The one or more non-transitory computer storage media of claim 14, wherein the action includes transmitting an RRC connection request to the satellite prior to the future time that the satellite will stop providing the service to the user device.

19. The one or more non-transitory computer storage media of claim 18, the method further comprising receiving an RRC connection release message from the satellite, based on transmitting the RRC connection request, prior to the future time.

20. The one or more non-transitory computer storage media of claim 19, wherein the RRC connection release message includes an updated time to live parameter within a spare field.

* * * * *